United States Patent Office.

GEORGE D. FIELD, OF NEW ORLEANS, LOUISIANA.

Letters Patent No. 100,516, dated March 8, 1870.

IMPROVED MEDICAL COMPOUND OR OINTMENT.

The Schedule referred to in these Letters Patent and making part of the same.

*To all whom it may concern:*

Be it known that I, GEORGE D. FIELD, of the city of New Orleans, and State of Louisiana, have invented a certain new, useful, and improved Medical Compound, which I distinguish by the name of "Field's Magic Ointment;" and I do hereby declare the following to be a full, clear, and exact description of the same and of my method of compounding and using it.

Supposing I wish to make ten pounds of my compound, I take of charred or burnt old leather, as for example, the leather of worn-out boots, shoes, harness, or the like thing, one pound or tenth part; of lard or tallow, or other equivalent oleaginous substance, two pounds; of sugar of lead, two pounds; of red precipitate, three pounds; and of sulphur and cloves, each one pound, and put them together in a suitable mortar, wherein I reduce them, by pounding with a pewter pestle, to a complete condition of disintegration, and effect a thorough admixture of all the parts. The mass, when thus reduced, assumes the consistency of a thick paste, and is of course, as to every atom of it, completely homogeneous. It is now put into proper receptacles and is ready for use.

My ointment is a specific for all cutaneous eruptions and diseases in men and animals. It is an infallible remedy for piles, tetter, and ringworm, old and new sores and the like in man, and for sore backs and skin diseases of horses and mules. It will cure mange and all similar diseases in dogs and hogs, and in this and all other cases its effect is wonderfully prompt and rapid.

It is applied after the manner of all salves, that is to say, by spreading it over the sore or diseased part, with or without a covering rag or cloth, according as the location of the part affected may or may not require the use of such cloth.

Having thus described my invention,

What I claim, and desire to secure by Letters Patent, is—

The compound herein described, when the same is composed of the ingredients given in the proportions stated and is compounded substantially in the manner herein set forth.

GEO. D. FIELD.

Witnesses:
 LYMAN HARDING,
 H. N. JENKINS.